(12) United States Patent
Leu

(10) Patent No.: US 7,548,354 B2
(45) Date of Patent: Jun. 16, 2009

(54) SCANNER

(75) Inventor: Jyh-Woei Leu, Taipei (TW)

(73) Assignee: Qisda Corporation, Taoyuan County (TW)

( * ) Notice: Subject to any disclaimer, the term of this patent is extended or adjusted under 35 U.S.C. 154(b) by 995 days.

(21) Appl. No.: 10/965,424

(22) Filed: Oct. 14, 2004

(65) Prior Publication Data

US 2005/0094219 A1 May 5, 2005

(30) Foreign Application Priority Data

Oct. 15, 2003 (TW) .............................. 92128511 A

(51) Int. Cl.
*H04N 1/04* (2006.01)
(52) U.S. Cl. ........................ 358/487; 358/488; 358/498; 358/474
(58) Field of Classification Search ................ 358/487, 358/488, 498, 474, 505, 506; 348/96, 97
See application file for complete search history.

(56) References Cited

U.S. PATENT DOCUMENTS

| 5,109,241 | A | * | 4/1992 | Keeney ....................... 396/207 |
| 5,327,259 | A | * | 7/1994 | Furusawa .................... 358/448 |
| 5,561,284 | A | * | 10/1996 | Kiyonaga .............. 235/462.05 |
| 5,995,204 | A | * | 11/1999 | Hoshino et al. ............... 355/75 |
| 6,195,182 | B1 | * | 2/2001 | Kunishige .................... 358/487 |
| 6,714,324 | B1 | * | 3/2004 | Kurosawa et al. ........... 358/487 |
| 7,149,010 | B2 | * | 12/2006 | Tecu et al. ................... 358/487 |

FOREIGN PATENT DOCUMENTS

JP 2000-312277 11/2000

* cited by examiner

*Primary Examiner*—Houshang Safaipour

(57) ABSTRACT

A scanner. The scanner comprises a mask, a document holder and a controller. The mask has a sensor disposed on the surface thereof. The document holder has a identification portion disposed on the surface thereof. The sensor detects the identification portion and sends an identification signal to the controller. The controller determines a document type and directs the scanner to scan the document according to the identification signal.

14 Claims, 6 Drawing Sheets

SCANNER

BACKGROUND OF THE INVENTION

1. Field of the Invention

The present invention relates to a scanner, and in particular to a scanner that determines document type automatically.

2. Description of the Related Art

The conventional scanner can scan both positive and negative films. The development processes for positive film and negative film are different; thus, before scanning the document, a positive film scanning module or a negative film scanning module must be selected on the computer. Or, to the complex setting procedure, however, a user may neglect to select the correct document type setting. Positive and negative film scanning require more light exposure; thus, if the document type setting does not match the document type, the user can correct the setting only after scanning, resulting in wasted time.

SUMMARY OF THE INVENTION

The present invention comprises a mask, a document holder and a controller. The mask has a sensor disposed on the surface thereof. The document holder has a identification portion disposed on the surface thereof. The sensor detects the identification portion and sends a identification signal to the controller. The controller determines a document type and directs the scanner to scan the document according to the identification signal.

Utilizing the present invention, no additional document type setting is necessary. The scanner determines the document type automatically, thus, eliminating incorrect settings and reducing time spent scanning.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
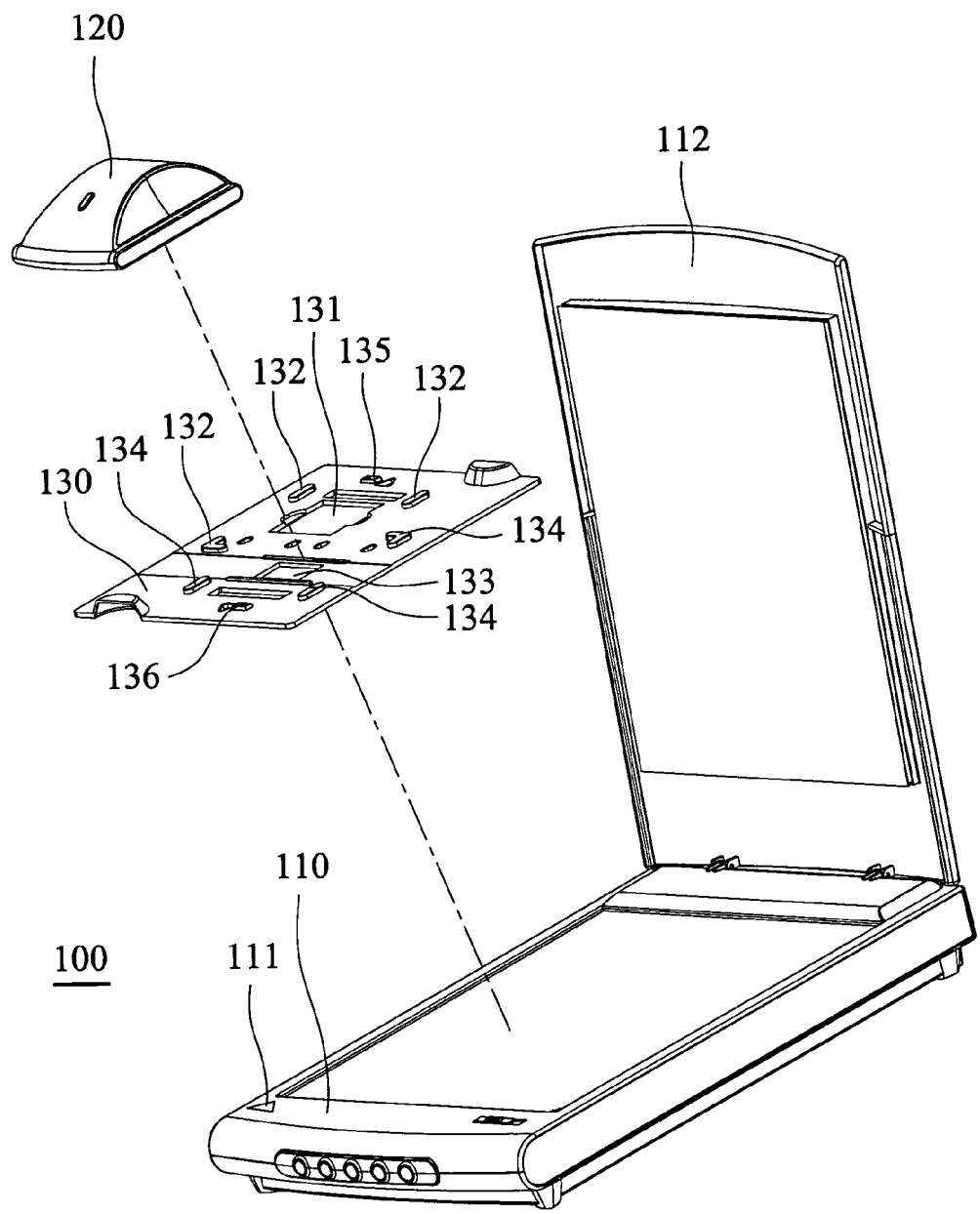
FIG. 1a shows a scanner of the present invention.

FIG. 1a shows a scanner 100 of the present invention, which comprises a scanner body 110, a mask 120 and a document holder 130. The scanner body 110 has a controller (not shown) disposed therein. A cover 112 and a locating mark 111 are provided on the scanner body 110. The document holder 130 is used for holding positive or negative film, and comprises a positive film holder 131, a first locating structure 132, a negative film holder 133, a second locating structure 134, a first identification portion 135 and a second identification portion 136. The mask 120 is disposed on the document holder 130 for reflecting light from the scanner 100.

Figure 1B:
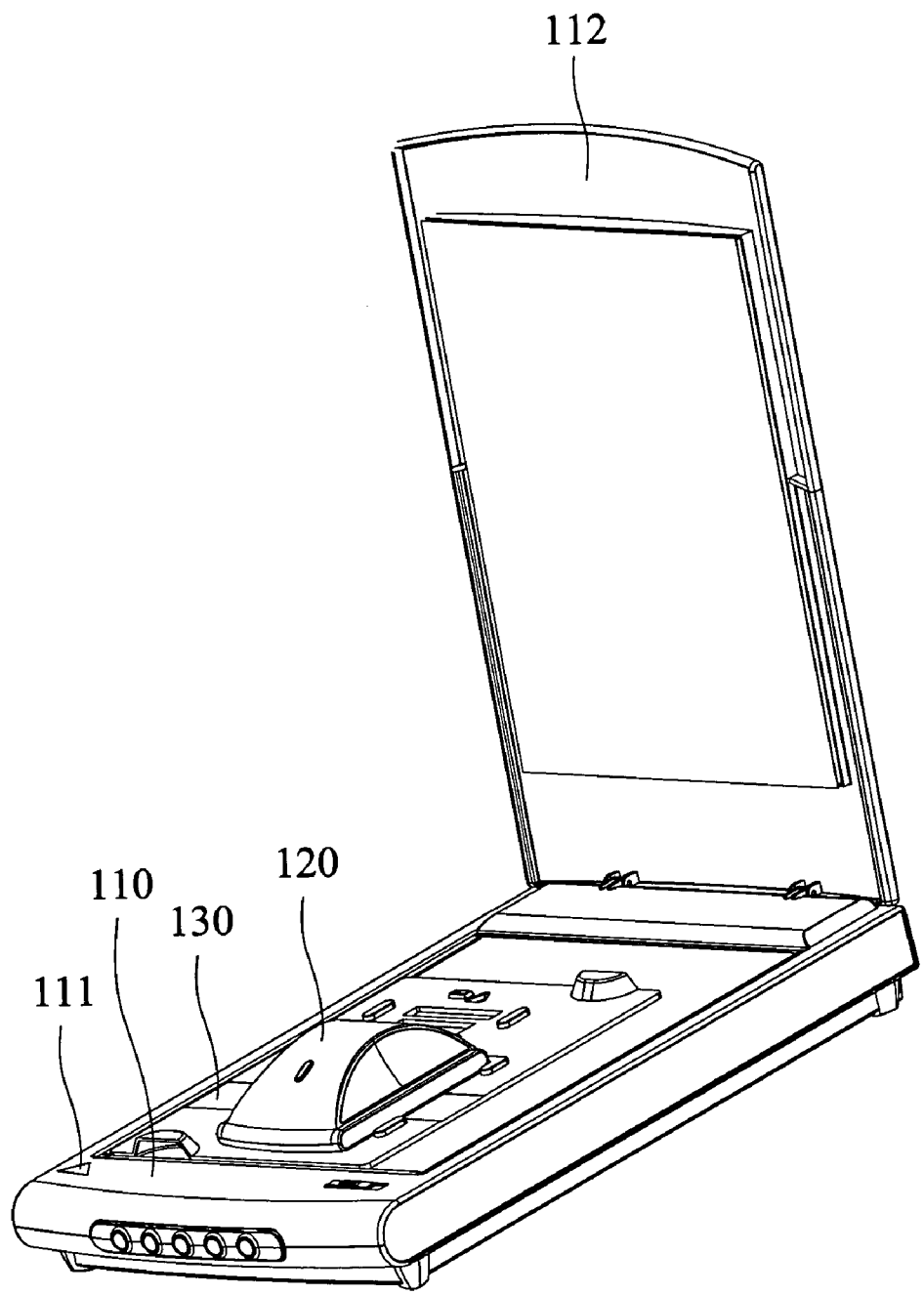
FIG. 1b shows a scanning condition of the present invention.

As shown in FIG. 1b, when the scanner scans the film, the document holder is placed at the corner indicated by the locating mark 111. The mask 120 is placed on a first scanning position defined by the first locating structure 132 or a second scanning position defined by the second locating structure 134.

Figure 2:
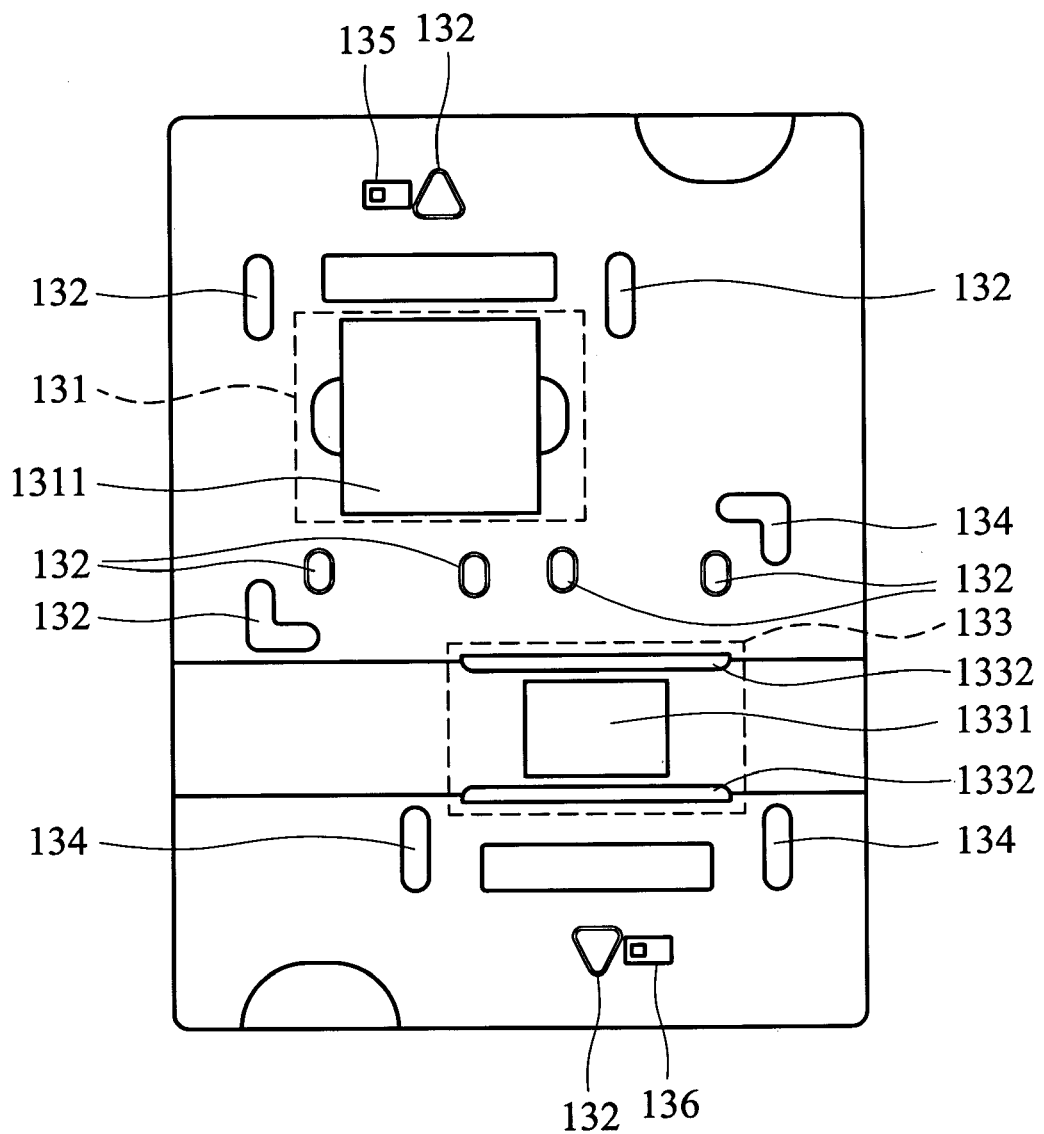
FIG. 2 shows a document holder of the present invention.

FIG. 2 shows the detailed structure of the document holder 130. The document holder 130 is a flat structure. The positive film holder 131 has a through hole 1311 through the two surfaces of the document holder 130. A first locating structure 132 is disposed around the positive film holder 131 and locates the mask 120 at the first scanning position. The first identification portion 135 is disposed close to the positive film holder 131. The negative film holder 133 has a through hole 1332 through the two surfaces of the document holder 130 and grooves 1331. A second locating structure 134 is disposed around the negative film holder 133 and locates the mask 120 at the second scanning position. The second identification portion 136 is disposed close to the negative film holder 133.

Figure 4A:
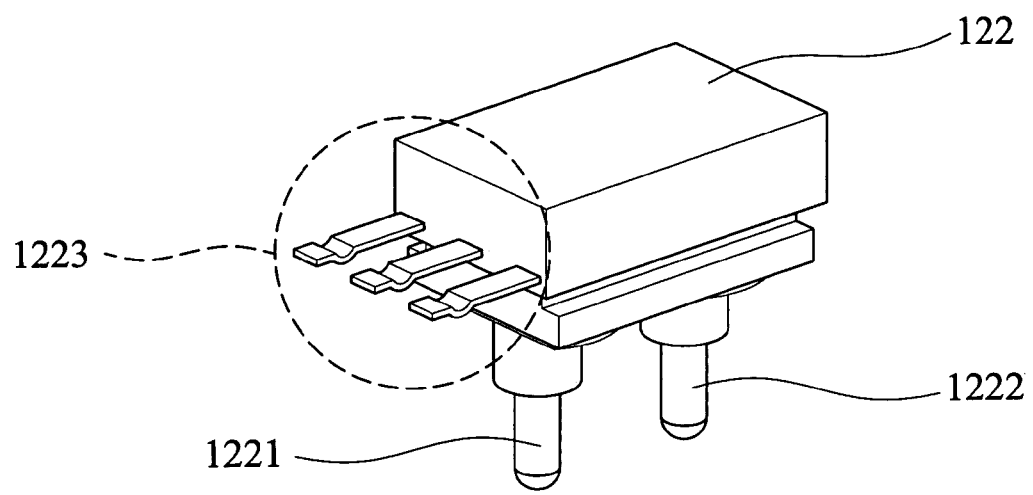
FIG. 4a shows a sensor of the mask.

FIG. 4a shows the detailed structure of the bottom of the mask 120, which comprises a locating structure 121 and a sensor 122. The sensor 122 has a first sensing element 1221 and a second sensing element 1222. When the mask 120 is placed on the document holder 130, the sensor 122 detects the first identification portion 135 or the second identification portion 136 by the first sensing element 1221 and the second sensing element 1222, and sends a first identification signal or a second identification signal to the controller. The controller determines the document type, and directs the scanner to scan the document according to the first identification signal and the second identification signal. The sensor 122 comprises tact switches or optical switches. The first identification portion 135 and the second identification portion 136 are protrusions or reflective patterns.

Figure 3:
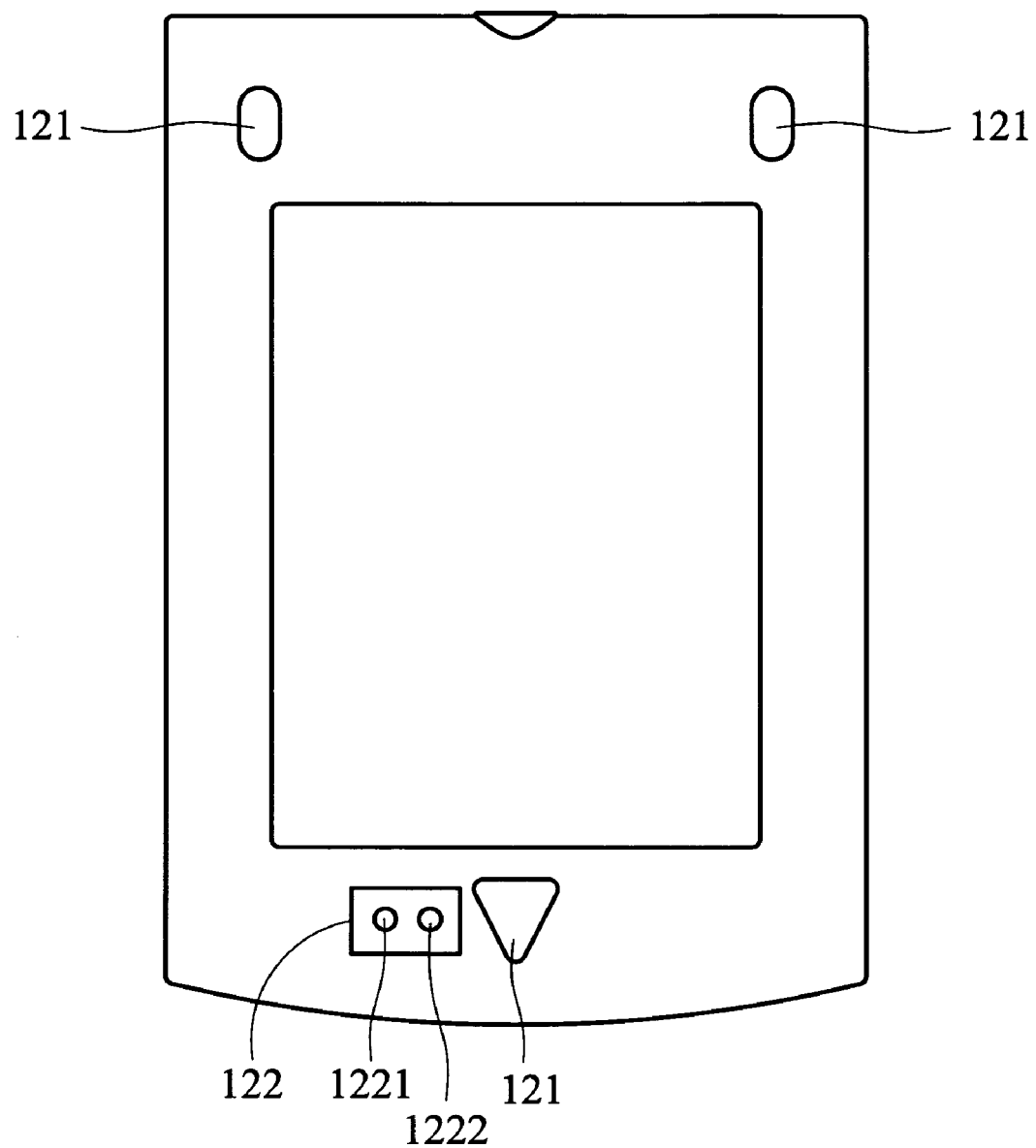
FIG. 3 shows a mask of the present invention.
Figure 4B:
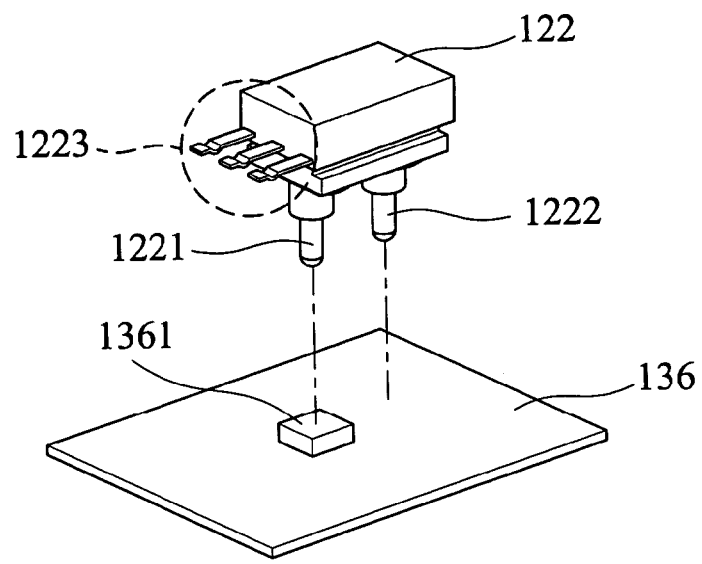
FIG. 4b shows a detection condition as the scanner scans positive film.
Figure 4C:
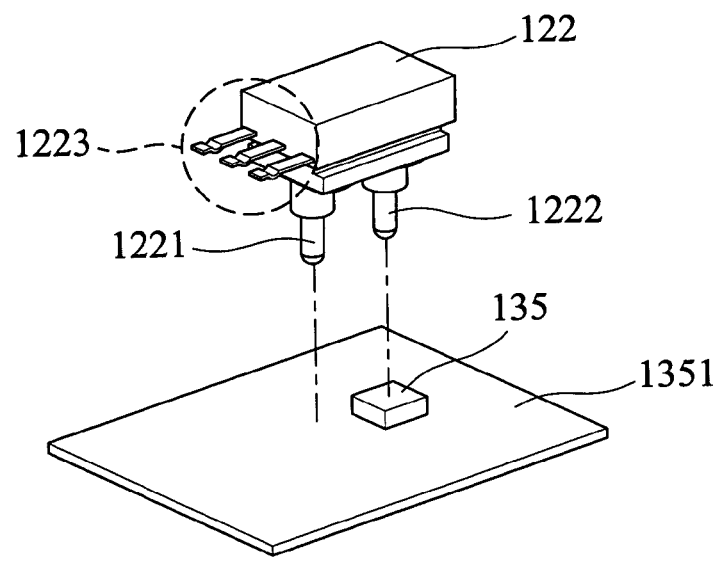
FIG. 4c shows a detection condition as the scanner scans negative film.

FIG. 3 shows the detailed structure of the sensor 122. The first sensing element 1221 and the second sensing element 1222 are tact switches disposed on the bottom of the sensor 122. The sensor 122 has a signal output port 1223 to send the first identification signal and the second identification signal. As shown in FIG. 4b, when the scanner scans positive film, a protrusion 1351 of the first identification portion 135 contacts the first sensing element 1221, and the sensor 122 sends the first signal to the controller. Thus, the controller determines the document as positive film. Similarly, as shown in FIG. 4c, when the scanner scans a negative film, a protrusion 1361 of the second identification portion 136 contacts the second sensing element 1222, and the sensor 122 sends the second signal to the controller. Thus, the controller determines the document as negative film. Additionally, when the first sensing element 1221 and the second sensing element 1222 are not contacted, the controller determines the document as paper.

The scanner mentioned above reflects light with the mask 120 when the scanner scans film. If the scanner reflects the light with the cover 112 when scanning film, however, the sensor can be also disposed on the cover 112 to detect the document type. The documents to be determined are not limited to positive or negative film; thus, other types of documents can also be determined. Additionally, the positive film holder and the negative film holder can be disposed on separate document holders.

Utilizing the present invention, no additional document type setting is required. The scanner determines the document type automatically, thus, eliminating incorrect settings and reducing time spent scanning.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scanner for determining document type automatically, comprising:
   a mask, having a surface;
   a sensor, disposed on the surface of the mask;
   a document holder, for holding a document, the document holder comprising two identification portions disposed around two different sides of the document holder, wherein, when the scanner scans the document, the sensor selectively detects one of the identification portions, and determines a identification signal according to the detected identification portion;
   a controller, receiving the identification signal, determining the type of the document, and directing the scanner to scan the document according to the identification signal.

2. The scanner as claimed in claim 1, wherein the sensor comprises a first sensing element and a second sensing element, to selectively detect one of the identification portions, and send a first signal or a second signal to the controller.

3. The scanner as claimed in claim 2, wherein the first sensing element and the second sensing element are switches.

4. The scanner as claimed in claim 3, wherein the identification portions are protrusions, when one of the identification portion contacts the first sensing element, the sensor sends the first signal to the controller, and when the other one of the identification portion contacts the second sensing element, the sensor sends the second signal to the controller.

5. The scanner as claimed in claim 1, wherein the document holder is a flat structure, further comprising a positive film holder and a first location structure, the positive film holder having a through hole through two surfaces of the document holder, the first locating structure disposed around the positive film holder and locating the mask at a first scanning position.

6. The scanner as claimed in claim 1, wherein the document holder is a flat structure, further comprising a negative film holder and a second location structure, the negative film holder having a through hole through two surfaces of the document holder, the second locating structure disposed around the negative film holder and locating the mask at a second scanning position.

7. A scanner for determining document type automatically, comprising:
   a cover, comprising a sensor disposed on the surface of the cover;
   a document holder, for holding a document, the document holder comprising two identification portions disposed around two different sides of the document holder, wherein, when the scanner scans the document, the sensor selectively detects one of the identification portions, and determines a identification signal according to the detected identification portion;
   a controller, receiving the identification signal, determining the type of the document, and directing the scanner to scan the document according to the identification signal.

8. The scanner as claimed in claim 7, wherein the sensor comprises a first sensing element and a second sensing element, disposed on the sensor, to selectively detect one of the identification portions, and send a first signal or a second signal to the controller.

9. The scanner as claimed in claim 8, wherein the first sensing element and the second sensing element are switches.

10. The scanner as claimed in claim 9, wherein the identification portions are protrusions, when one of the identification portions contacts the first sensing element, the sensor sends the first signal to the controller, when one of the identification portions contacts the second sensing element, the sensor sends the second signal to the controller.

11. A scanner, comprising:
    a cover for covering a document;
    a sensor disposed on the cover;
    a document holder for holding the document selectively on a first scanning position and a second scanning position, the document holder comprising:
       a first identification portion disposed around the first scanning position of the document holder; and
       a second identification portion disposed around the second scanning position of the document holder, wherein the sensor selectively detects one of the first identification portion and the second identification portion, and determines a identification signal according to the detected identification portion; and
    a controller directing the scanner to scan the document and determining a type of the document according to the identification signal.

12. The scanner as claimed in claim 11, wherein when the document is disposed on the first scanning position and the sensor detects the first identification portion, the scanner scans the document with a first type, wherein when the document is disposed on the second scanning position and the sensor detects the second identification portion, the scanner scans the document with a second type.

13. The scanner as claimed in claim 11, wherein the document holder further comprising:
    a first locating structure disposed around the first scanning position for locating the cover.

14. The scanner as claimed in claim 13, wherein the document holder further comprising:
    a second locating structure disposed around the second scanning position for locating the cover.

* * * * *